United States Patent [19]

Sargent et al.

[11] Patent Number: 4,740,895
[45] Date of Patent: Apr. 26, 1988

[54] METHOD OF AND APPARATUS FOR EXTERNAL CONTROL OF COMPUTER PROGRAM FLOW

[75] Inventors: Brian Sargent, Tyngsboro; James Skilling, Harvard, both of Mass.

[73] Assignee: GenRad, Inc., Concord, Mass.

[21] Appl. No.: 62,399

[22] Filed: Jun. 15, 1987

Related U.S. Application Data

[60] Continuation of Ser. No. 777,543, Sep. 19, 1985, abandoned, which is a division of Ser. No. 295,765, Aug. 24, 1981, Pat. No. 4,554,630.

[51] Int. Cl.$^4$ .............................................. G06F 3/00
[52] U.S. Cl. ........................................ 364/200; 371/18
[58] Field of Search ................... 371/15, 16, 18, 25; 364/200 MS File, 900 MS File

[56] References Cited

U.S. PATENT DOCUMENTS

| | | | |
|---|---|---|---|
| 3,478,322 | 11/1969 | Evans | 364/200 |
| 3,631,406 | 12/1971 | Kurner | 364/200 |
| 3,838,400 | 9/1974 | Meadows et al. | 361/900 |
| 3,879,712 | 4/1975 | Edge et al. | 361/200 |
| 3,908,099 | 9/1975 | Borbas et al. | 371/8 |
| 3,909,802 | 9/1975 | Cassarino, Jr. et al. | 364/200 |
| 4,095,270 | 6/1978 | Blum et al. | 364/200 |
| 4,144,563 | 3/1979 | Heuer et al. | 364/200 |
| 4,442,485 | 4/1984 | Ota et al. | 364/200 |
| 4,460,972 | 7/1984 | Homan et al. | 364/900 |
| 4,554,630 | 11/1985 | Sargent et al. | 364/200 |

OTHER PUBLICATIONS

A. Mastrocola, Effective Utilization of In-Circuit Techniques, pp. 106–117.
D. G. West, Analyzer+Emulation=Faster Board Testing, pp. 177–182.
P. Thompson, Node Forcing Techniques, pp. 31–33.

*Primary Examiner*—Gary V. Harkcom
*Assistant Examiner*—David L. Clark
*Attorney, Agent, or Firm*—Rines and Rines, Shapiro and Shapiro

[57] ABSTRACT

This apparatus controls the execution and content of computer programs in equipment containing a computer by causing the transfer of program data elements, including computer instructions, with a memory means of the apparatus, wherein the selection of data for transfer is effected either by the computer, operating in a normal manner, or by the apparatus, which may shift data selection between these two selection options so that the computer ceases selection of data constituting one program and begins selecting data of another program. While data elements are being transferred with the computer, other elements of the memory means are available for examination and modification such that new programs, the content of which may depend on the results of prior program execution, can be loaded, executed, and examined without interrupting, delaying, halting, or otherwise disturbing the instruction flow of the computer equipment.

12 Claims, 3 Drawing Sheets

METHOD OF AND APPARATUS FOR EXTERNAL CONTROL OF COMPUTER PROGRAM FLOW

This is a continuation application of Ser. No. 777,543, filed Sept. 19, 1985 (abandoned), which is a divisional application of Ser. No. 295,765, filed Aug. 24, 1981 (now U.S. Pat. No. 4,554,630 issued Nov. 19, 1985).

The present invention relates to methods of and apparatus for external control of computer program flow, being more particularly, though not exclusively, concerned with the testing of equipment containing computers, wherein such apparatus is connected to the computer equipment, and in which control of the program flow effects programs designed for the detection and location of faults in such equipment.

BACKGROUND OF THE INVENTION

Several prior techniques have been evolved for, or are susceptible of adaptation to, testing computer-based equipment by way of externally connected apparatus. Among such prior methods involving the concept of testing by control of the computer are processor analyzer methods and processor emulation methods. Examples of equipment using these methods are: The Advanced Microprocessor Development System manufactured by the assignee of the present invention, GenRad, Inc., Los Angeles, CA, described, for example, in Manual No. 2300-5004-00 of that company, 1979, entitled "Future Data Universal Logic Analyzer Manual," and in an article entitled "Architecture based on multiple μPs, buses booster in-circuit emulation", appearing in Electronics Design, 9, April 26, 1979, p. 52–55; The MicroSystem Analyzer manufactured by Millennium Systems Inc., Cupertino, CA, described in their bulletin "Millenium" of 12/79; and Microprocessor Analyzer manufactured by AQ Systems Inc., Yorktown Heights, NY, described in their bulletin "Microprocessor Analyzer (MPA) Model AQ 6800." Prior process analyzer and emulation techniques are described, also, in "Microprocessor Troubleshooting Techniques," D. Wiseman, Electronics Test, Vol. 3, No. 2, February 1980, p. 42 on; in "Testing Microprocessor Products in the Field," Electronics Test, Vol. 2, No. 9, September 1979, p. 43, on; and in the Proceedings-Automated Testing for Electronics Manufacturing &Test Instruments Conference, Jan. 7–10, 1980 "An Advance In Test Strategy Development For A Microcomputer PC Board", P. Hansen, p. 17, on.

In connection with the processor analyzer approach, such analyzers generally attach to the processor of the controlled computer and are used to observe and display data associated with its operation. They have, however, a limited ability to influence program content and execution.

The processor emulators, on the other hand, contain a computer system similar to that of the equipment under test and, in application, the processor of the emulator replaces that of the equipment, requiring the equipment processor to be removable. By means of switch functions, a system for program execution can be made up selectively of parts of the emulator and parts of the equipment. A program, for example, can be run with part of it in the memory in each; or the system clock can be taken from either. Emulators are generally used in new product development and debugging activities.

Both process analyzers and emulators do make some use of the capabilities of the equipment. They may require, for example, that certain interrupt vectors be available for use by the testing device, or they may use particular locations in equipment memory. A design objective of analyzers and emulators is to minimize all such forms of dependence upon shared facilites, or to bring about a quality called "transparency". Analyzers and emulators can be made "transparent" to a high degree, but they thereby become complex and expensive.

It is, accordingly, a principal object of the present invention to provide a new and improved method of and apparatus for external control of computers that shall not be subject to the above-described limitations, but in application, provides a simple means of computer control with concomitant benefits in reliability of operation and in cost, important because application is intended for a wide variety of computer types in which adapting prior art methods and apparatus would cause extensive complexity, particularly since computer architecture varies more in program flow control aspects than in other aspects, such as memory and input-output device interfaces.

It is a further object of the invention to use a minimum of features of the computer being controlled, so that faults in such features, or normal use of such features by the equipment associated with the computer, will not interfere with proper operation of the controlling apparatus, thereby imposing few, if any, constraints upon the design or operation of computer equipment required for application of the method and apparatus of the invention.

Straightforward application of prior art processor emulation methods, furthermore, may, at times, disconnect a memory element from the processor part of the computer being controlled. If the memory element is of the dynamic memory type, such disconnection from the processor, that normally supplies refresh signals to the memory, can result in loss of memory data, which is a further handicap in application of such methods. Another object of the invention, accordingly, is to provide a technique and apparatus that obviates such limitations by maintaining normal connection and memory refresh operation in the computer equipment when it is under external control.

It is also an object of the invention to provide a novel computer program flow control technique possessing the ability to establish and capture, or perhaps recapture, program flow in the computer being controlled. Clearly it is necessary to establish or begin, program instruction sequence execution from a specific point in memory after the apparatus has been connected to the computer equipment and various power and other conditions for operation have been obtained. It is desirable to be able to re-establish program execution in a known way, sometimes in the event that the sequence of computer instruction execution should, for some reason, proceed in an unanticipated way. Such reasons are not uncommon and stem from errors in program content, faults in equipment, unanticipated states in equipment, etc.

Other and further objects will be explained hereinafter and are more particularly delineated in the appended claims.

SUMMARY OF INVENTION

In summary, the invention provides a method whereby apparatus external to computer bearing equipment can be attached to the equipment to cause the computer to execute instructions and exchange other data with the apparatus in a controllable, specifiable, and sequential manner; that is, allowing external control of computer program execution or flow. The method is one of memory emulation, since it is a memory part of the apparatus that stores program information for exchange with the computer; and this memory is made to function as though it was part of the computer. Program data exchange, or flow, is not constrained to transactions between computer and apparatus, but may, for intervals, occur solely within the computer. For such intervals, the transaction takes place between memory parts integral to the computer and the processor part of the computer. Program execution is allowed to take place in a part of the memories discused above, while other parts of the (external) memory may have their contents tested, modified, or reloaded. Then program execution can be shifted to recently tested memory part and the part of previous execution can be tested, etc. By these and other means the computer can be kept continuously operating on instructions and other data, and yet the results of program execution can be observed and new programs specified. Continuous operation greatly simplifies the control means of the method.

Thus, control of the microprocessor under test is not relinquished at any time, and the memory which performs the emulation is given over to the test system for analysis, with the microprocessor under test being under idle memory control at such time.

It is convenient for purposes of continuous operation to employ a computer program that keeps the computer operating in its program execution mode and yet performs no operations other than those of execution. Such a program can be constructed of a series of no-operation instructions followed by a jump instruction that carries the computer back to the first of the no-operation instructions. If the computer is caused to execute any of the instructions in this loop program, it will then proceed to indefinitely execute the program, and will perform no program functions other than fetch and execute the instructions of the loop.

An effective implementation of the method of the invention alternately executes in the idle loop program described above and in programs designed to achieve some useful action. The preferred embodiment of the invention, therefore, employs two memory parts; one, called the diagnostic memory, to contain various purposeful programs, and a second, called the idle memory, to contain an idle loop program. The diagnostic memory, when serving as a program source, responds to computer read/write and address signals to supply or accept associated stored data. The idle memory address is made up of a subset of the computer address signal so each address increment of the computer is also an address increment of the idle memory. An alternate embodiment of the invention uses counter methods to supply the idle memory addres synchronous with computer address signals. In both methods the idle memory address is stepped address-by-address from a first to a last address and then the sequence is repeated. Such operation can involve the development of linear cyclic address sequences. These methods of addressing provide that the idle memory, when acting as program source, will cause execution of the idle loop regardless of the past or initial content of the computer address signals. The idle memory can thus capture the computer program flow.

In the preferred embodiment of the invention, program execution is shifted from memory to memory by means that switch the computer data signals from memory to memory in response to recognition of one of a specified set of values of the computer address signals, or in response to other control means. In application, it is possible that computer address signals will cause simultaneous response of memory parts of the computer and memory associated with the apparatus of the invention. In such cases of memory contention, the preferred embodiment of the method provides that the response of the apparatus will prevail.

From one of its broader viewpoints, the invention embraces external computer control apparatus for use with a computer having addressed memory comprising, diagnostic memory means external to the computer memory and provided with addressed data; means for connecting the diagnostic memory means to the computer comprising means for over-riding the data stored in the computer memory at predetermined addresses to force the data at corresponding addresses in the diagnostic memory means to be utilized by the computer in substitution of the data stored in the computer memory at said addresses. Best mode embodiment and preferred apparatus implementation details are hereinafter presented.

BRIEF DESCRIPTION OF THE DRAWINGS

The invention will now be described in connection with the accompanying drawings, FIG. 1 of which is a block diagram of a preferred embodiment of the apparatus, operating in accordance with the method of the invention.

DESCRIPTION OF THE PREFERRED EMBODIMENTS OF THE INVENTION

The preferred embodiment of the invention provides a means of externally controlling exemplary 8-bit type microcomputers. This is both a useful application and one that simply illustrates the invention, which, however, is in no way restricted to 8-bit type microcomputers, being equally useful to control 16-bit microcomputers, minicomputers, etc. by means that will be apparent to one skilled in the art.

Figure 1:
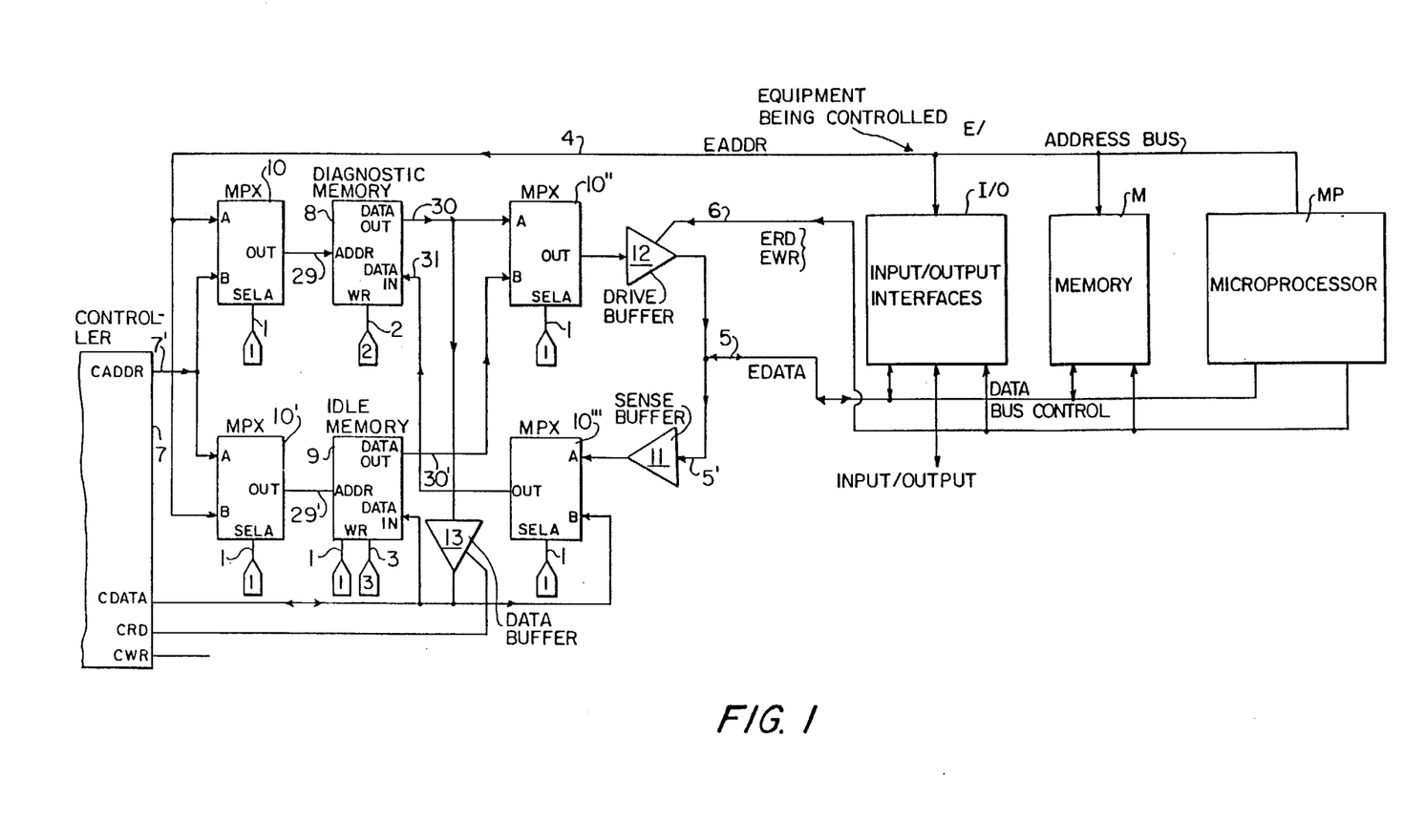

In the illustrative embodiment shown in the drawings, the following signals of the equipment under control are referenced:

Address: 16 binary signals, carried on a 16-conductor address bus 4, FIG. 1, that represent the binary-coded numbered memory location at which data is to be read or written. These signals are designated EADDR.

Data: 8 binary signals, carried on an 8-conductor data bus 5 designated EDATA, that are the data to be transferred to or from memory by a write or read operation.

Read: a binary signal, carried on a single conductor 6 designated ERD, which, when asserted, causes a memory read operation to take place.

Figure 2:
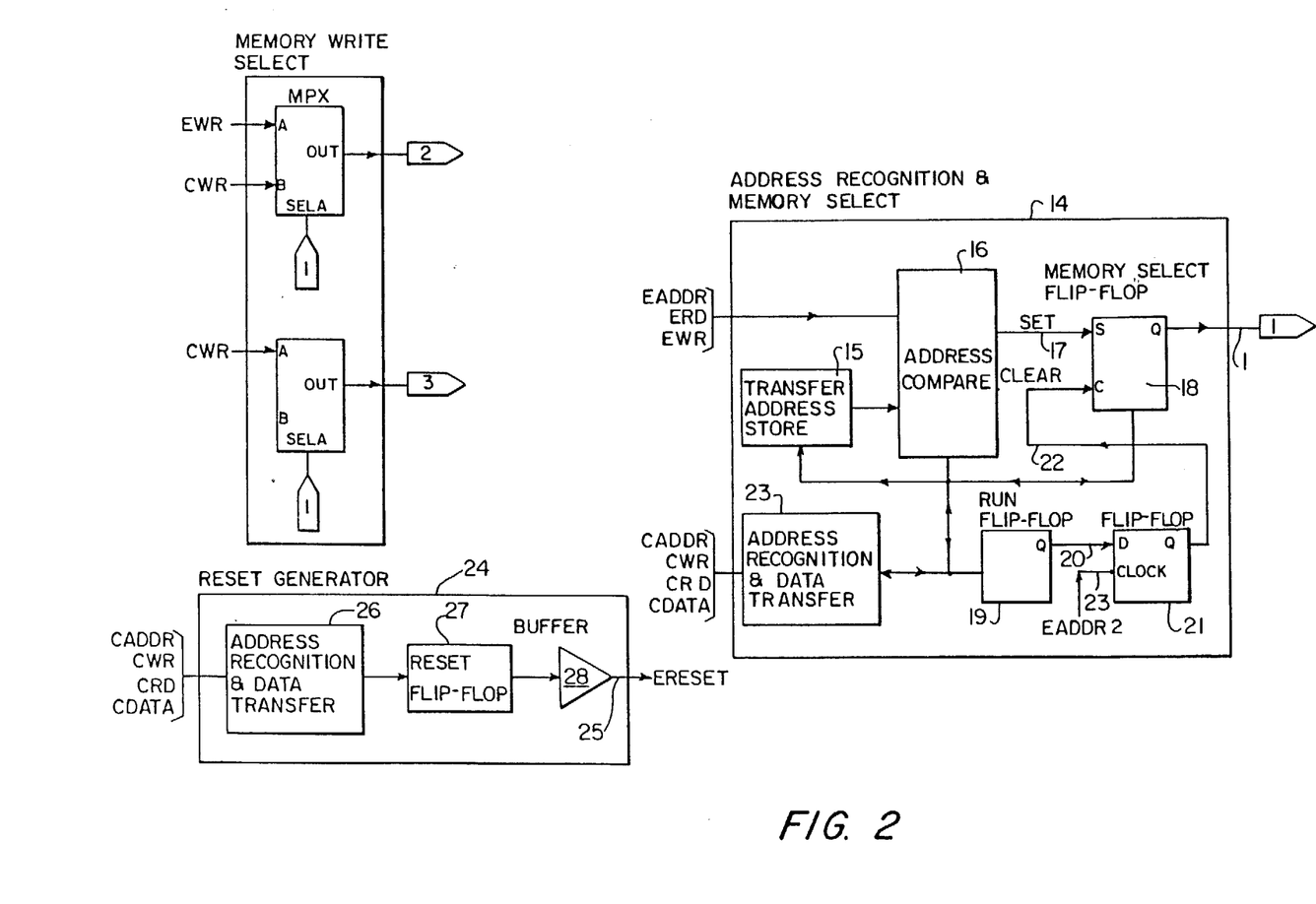
FIG. 2 is a similar diagram showing details of address recognition and memory select and reset generator portions of the apparatus useful in the system of FIG. 1.

Write: a binary signal, designated EWR, FIG. 2, which, when asserted, causes a memory write operation.

These signals are, or are simply derived from, those of, for example, a typical 8-bit microprocessor such as the type Z-80 made by Zilog, Inc., Cupertino, Calif. or the type 8080 of Intel, Inc., Santa Clara, Calif. The apparatus of the invention employs a controller 7 that exchanges memory data, status data, etc. in a specific time order with the remaining parts of the apparatus. A preferred implementation of the controller 7 is a microcomputer, as of the above-described types, and associated peripherals such as keyboard, display and disk drive. The controller allows an operator to observe and specify the operation of the apparatus, operating the same by means of address, data, read, and write signals designated CADDR, CDATA, CRD, and CWR, respectively, which have functions identical to corresponding equipment signals above.

To the right in FIG. 1 is illustrated, in generalized form, the nature of computer equipment E which may be controlled in accordance with the present invention. Reference may also be made to "Microcomputer-Based Design," John B. Peatman, McGraw-Hill, 1977, and to "MCS-85 User's Manual," Intel Corp., Santa Clara, Ca., pages 1–6ff for similar descriptions. The elements of the computer-to-be-controlled E are shown grouped into three blocks:

Microprocessor MP-Develops addresses, processes data, controls timing and sequence of operations, etc. It is sometimes called the central processing unit (CPU), and need not be a "micro" type processor.

Memory M-May include read-only (ROM) or read-write (RAM) type.

Input-Output Interfaces I/O-Provides means for the computer to send and receive data, via "Input/output" connections. These elements are connected by three types of previously referenced connections:

Address Bus 4-Means by which the microprocessor directs the source and destination of data transfers (EADDR).

Data Bus 5-Convey data—usually a bidirectional set of signals conveyed on one set of connections (EDATA).

Control 6-A collection of connections that carry the microprocessor signals to establish the timing and nature of data transfers. This set of connections is often called the control bus and may include signals for interrupt, direct memory transfer, normal data transfer, start up, etc. For illustrative and simplification purposes, only the signals for normal reading and writing of memory are labelled—ERD and EWR.

In FIG. 1, the address bus 4 applies the EADDR signals to the A input of a path-switching multiplex circuit MPX10, the output of which is applied at 29 to the ADDR input of the diagnostic memory 8, and to the B input of a similar path-switching multiplex circuit MPX10', the output 29' of which is applied to the ADDR input of the idle memory 9. The controller 7 is shown applying its CADDR output at 7' to the respective B and A inputs of the MPX10 and MPX10' switching circuits, the switching action of which is controlled by the state of signals "1" at the SELA inputs.

The ERD, EWR control signals from the computer equipment E being controlled are shown applied at 6 to a hereinafter described drive buffer 12 to which the output of a further multiplex switcher MPX10'' is also applied. The A input of MPX10'' receives the data output from the diagnostic memory 8 by way of path 30; and the B input of MPX10'' receives the data output from the idler memory 9 by way of conductor 30'—under the control of the state of signals 1 at the SELA input. The driver buffer 12 and the data bus 5 are connected to input the sense buffer 11 at 5', the data bus 5 carrying the EDATA signals. The sense buffer 11 inputs further multiplex switches MPX10''' at A, the B input of which is connected to the CDATA output of the controller 7—again, with the state of signal 1 controlling the switching at input SELA. The output of MPX10''' is fed at 31 to the data-in terminal of the diagnostic memory 8, while the data-in terminal of the idle memory 9 is connected to the CDATA line of the controller 7.

The diagnostic memory part of the external memory, as later explained, is controlled at the WR input by the state of signals "2", and the idle memory is similarly controlled at its WR input by signals "3" and also by the state of switch control signal 1. The data output at 30 of the diagnostic memory 8 is also applied to a data buffer 13 receiving input from the controller CRD line and applying output to the CDATA line and the input B of MPX10'''.

It is now in order further to describe the diagnostic memory 8 and idle memory 9, forming two parts of an external memory, as well as the paths taken by addresses and data associated with these memories. Path switching is accomplished by means of the multiplex (MPX) circuits that each connect A inputs to outputs when the SELA signal is asserted or else B inputs are switched to outputs. MPX10, for example, that supplies the diagnostic memory address, switches the 16-memory address signals to either the controller or equipment address bus, depending on the state of signal 1. The MPX circuits of FIG. 1 and the later-described memory-write select part of FIG. 2 are arranged so that when the memory select signal 1 is asserted the diagnostic memory 8 is connected to the equipment E being controlled, and the idle memory 9 is connected to the controller 7. When signal 1 is not asserted, the diagnostic memory 8 and controller 7 are connected, as are idle memory 9 and equipment E. The MPX circuits may be implemented with integrated circuits as of the Type SN74157, quad 2- to 1-line data selectors/multiplexers made by Texas Instruments, Dallas, Tex. or the like.

The diagnostic memory circuit 8, as an illustration, may store 1024 8-bit bytes of data. The data stored at the location specified by the address signals, ADDR, appears in the form of eight output signals at the beforementioned data out connections, DATA OUT. If the write input signal WR is asserted, the eight binary signals as the data input connections, DATA IN, are loaded into the addressed memory location. Type 2125 memory integrated circuits made by the aforementioned Intel Corp. can, for example, be used as the memory parts of this memory circuit 8. Only ten binary signals, or bits, are required to address 1024 memory locations; yet, the address bus has 16 bits which are used to specify memory addresses. The memory circuit contains direct connections from the address signal inputs of the memory parts to the least significant ten binary coded address signals of the circuit. The more significant six circuit address signals are connected to an address recognition part of the circuit that asserts an enable function of the memory parts when the proper addresses are present. Thus each of the 1024 memory locations has a unique 16-bit address.

The external memory part represented by the idle memory 9 of the preferred embodiment of the invention may store eight 8-bit bytes. The data out, data in, and WR- 3 signals, connected to the idle circuit, function in a manner similar to the corresponding signals of the diagnostic memory above-described. The particular storage dimensions of the diagnostic and idle memory circuits 8 and 9 are convenient, but other dimensions could be used. The size of the memories is not significant, within reason, to the method underlying the invention.

When the idle memory 9 is connected to the controller 7, as indicated by the state of the memory select signal 1, the address functions of the idle memory work in the same manner as those of the diagnostic memory 8. Each of the eight-bit bytes stored in the memory has a unique 16-bit controller address. When, however, the state of the memory select signal indicates that the idle memory is connected to the equipment E, the least significant four signals of the 16-bit equipment address bus are used directly to address the idle memory. Because of this manner of connection, every possible equipment address signal state will cause one of the idle memory bytes to be selected. In the jargon of the art, it can be said that the idle memory 9 is imaged everywhere in the address space of the equipment E. This is an important feature of the invention, the utility of which will subsequently be discussed in description of operations.

The before-mentioned buffers 11 and 12 are located effectively in series with the connections to the equipment data bus. The buffer amplifier 11 (sense buffer) receiving data from the equipment E is employed to reduce noise and loading. The buffer amplifier 12 (drive buffer) providing data to the equipment E has special properties of low output-impedance and high current-capability. During operation, the computer of the equipment may address simultaneously memory integral to itself as well as memory in the apparatus. In such a case, both memories would have the same address. The special properties of the drive buffer 12 insure that the computer data bus signals resulting from such contention are those of the apparatus—the integral stored equipment computer memory is back-driven by the buffer or over-ridden so its data outputs correspond to those of the apparatus. This forces the equipment computer to select the data element of the external memory rather than a simultaneously occuring similar addressed data element of the computer internal memory. The output of the drive buffer is also gated by the ERD, EWR control data at 6, so that apparatus data signals are applied to the equipment only when commanded by the read signal ERD.

In order to allow equipment memory to respond when it alone is addressed, the preferred embodiment actually may perform a logical AND operation on the ERD signal and the aforementioned diagnostic memory enable function signal to form the drive buffer gating signal. This simple operation, which is not shown in FIG. 1, allows the diagnostic memory to provide equipment data only when it is addressed.

The before-described gated data buffer 13 is imposed in the data connection to the controller 7 in order that it may apply data signals to the controller 7 only when commanded by the controller read signal CRD.

The invention thus involves back-driving the computer equipment being tested in some cases, as a result of overlaying tester memory in the address space of the computer under control. It should always be possible to back-drive the computer data bus as described. There are some cases, however, where the computer data bus buffer is husky and, in the implementation of the invention, it has been chosen not to back-drive the data bus buffer. This is an election of a design choice that avoids the use of very-high current data buffers in the apparatus and very short connections to the computer. Instead, selective disabling of the computer data bus buffers may be used. Another method is to gain access to the computer data bus buffers at the same point that computer memory does, which avoids back-driving the buffers (computer memory may still be back-driven).

Expanding on the memory overlay, any type of processor can address or manage a quantity of memory up to a certain amount dictated by its design. The amount of memory that a processor can address is usually referred to as its address space. For example, a processor having 16 address lines can address 2 to the 16th power, or 65,536, memory locations ($65,536 = 64 \times 1,024$ or "64K"). The computer designer attaches some memory to the processor to make the computer; that is, he "populates the memory space." The designer may have the processor address read-write memory (RAM), read-only memory (ROM), or even input-output (I/O) non-memory devices. Rarely is the memory space filled up with actual memory (or I/O), so there are usually gaps. In the case that a gap for location of the diagnostic memory can not be found, it is placed over the computer memory, i.e. overlaid. The computer and diagnostic memory share some common addresses, which when invoked cause response from both. The apparatus data buffers insure that the computer sees only the response from diagnostic memory—memory is over-ridden or back-driven to correspond to diagnostic memory data response. In this case the diagnostic memory can not interact with the computer memory it overlays. The former may have to be shifted around in the address space in order to interact piece-by-piece with the whole of computer memory.

It should be noted in FIG. 1 that the diagnostic memory 8 can be read and written by either the controller 7 or equipment E under control. Whereas the idle memory 9 can be written by the controller 7 and read by the equipment E. Such minimum communication with idle memory is not, however, a necessary or significant feature of the invention. Alternate embodiments could also allow the controller to read the idle memory for checking purposes. Allowing the equipment to write the memory would have no beneficial consequences on the manner of operation to be described.

The address recognition and memory select element 14, shown in FIG. 2 in functional block diagram form, is the means of generating the memory select signal 1 of FIG. 1. When the equipment address EADDR matches an address held in the transfer address store 15, the address compare circuit 16 generates a binary set signal output at 17. The address compare circuit receives the equipment read and write signals ERD and EWR in order to determine that the address carried on EADDR is a valid read or write address. The set signal at 17 sets a memory select flip-flop 18 which serves as the source of the memory select signal 1. In this manner, the idle memory 9 is selected when the equipment address matches a specific address held in the transfer address store 15.

The controller 7 is capable of establishing the state of the run flip-flop 19 of FIG. 2, the Q-output of which at 20 serves as the data or D input of a further flip-flop 21. The third most significant binary signal of the equipment address signals, EADDR2, is applied at 23 to the clock input of the flip-flop 21. The Q-output of flip-flop 21 is a binary clear signal at 22, and is applied to the input C of the memory select flip-flop 18. When the controller causes the run flip-flop Q-output to be asserted, and when the equipment address changes corresponding to a change from the last address of the idle memory to the first address of the idle memory 9, as indicated by a state change of signal EADDR2, the flip-flop 21 asserts the clear signal, causing the memory select flip-flop 18 to select the diagnostic memory 8. In this way, the controller 7 can cause program flow to shift from the idle memory 9 to the diagnostic memory 8 just after the last location in the idle memory has been addressed.

The address recognition and data transfer circuit 23 of FIG. 2 identifies certain preassigned controller addresses and allows data associated with these addresses to be read and written to parts of the address recognition and memory select element. Thus the controller 7 can establish the contents of the transfer address store 15, read and set the state of the memory select flip-flop 18, and control the state of the run flip-flop 19.

The reset generator element of the apparatus, shown at 24 in FIG. 2, allows the controller to generate a reset signal ERESET at 25, which can be inputted to the equipment E being controlled. An address recognition and data transfer circuit 26 in the reset generation 24 causes data associated with preassigned controller addresses to be read or written to the reset flip-flop 27. An output of the reset flip-flop is input to a buffer 28 the output of which is the reset signal ERESET. The buffer 28 has the special properties of low output impedance and high output current that allow it to establish the state of the ERESET signal in the event that elements of the equipment are also attempting to establish the state of the node connected to ERESET.

An illustration of the operation of the preferred embodiment of the invention will now be described in connection with an application calling for capture of program flow and its transfer between the diagnostic and idle memories 8 and 9. Assume that the equipment E, with proper power and other operating signals established, is connected to the apparatus, and the first operation is to capture program flow. The controller 7 first loads the idle memory 9 with an idle loop program such as:

| ADDRESS | CONTENTS |
|---|---|
| 0 | NOP (i.e. no operation other than fetch and execute next instruction) |
| 1 | NOP |
| 2 | NOP |
| 3 | NOP |
| 4 | NOP |
| 5 | Jump instruction opcode |
| 6 | Jump operand, address, Lo byte |
| 7 | Jump operand, address, Hi byte |

In this example, the idle loop consists of five consecutive, single byte, NOP instructions that perform no operation other than to cause the next instruction to be fetched and executed, followed by a 3-byte absolute jump instruction. The operands of the jump instruction, in this case, specify that execution will begin at address zero after the third byte of the instruction has been read by the computer. The controller next selects the state of the memory select flip-flop 18 to select the idle memory 9, and asserts the reset signal ERESET for a short interval. In general, the assertion of the reset signal will cause the computer of the equipment being controlled to assume certain internal states and to begin program execution in a specific manner. For the Z-80 or 8080 type Intel minicomputer assumed here, program execution simply begins at address zero. Consequently, the computer begins execution of the idle loop program and it will continue to do so until the controller alters the memory select signal.

An alternative method of capture is simply to switch the program flow to the idle memory 9 after the equipment has been caused to start executing instructions at any addresses. Since all addresses will address an idle loop program location, the computer will begin executing the program. Because the switching action that introduces the idle memory is not synchronized with computer execution, the computer may not be ready to receive opcodes or operands when switching occurs. Furthermore, unsynchronized switching may introduce spurious data. For these reasons the first few data transfers from the idle memory may not be interpreted as instruction. After a few memory read operations, however, the computer will accept idle memory contents as instructions. Such synchronized switching is a consequence of the simple embodiment of the invention. Alternate embodiments could provide for synchronized switching, if desired where the processor provides sufficient signals, as in the Intel processor Z-80 or 8080 with strobed reset.

While means to establish or to reestablish control over the program-flow of the computer being controlled is a necessary feature of a useful system, such is rarely invoked. With regard to the two discussed methods of capture, or recapture, of flow; the reset method will always work, but there are practical reasons that may prevent the switch-to-idle method from working in all cases, as if the computer has encountered a halt instruction. Reset will restart it, but switch-to-idle will not wake it up.

The next operation of interest is the execution of a program from the diagnostic memory 8. Let the equipment addresses that, for example, a 1024-location diagnostic memory responds to, be locations 0 through 1023. The choice of addresses is a function of implementation of the preferred embodiment and could be any of the addresses the computer can generate. The controller loads the program to be run into the diagnostic memory 8. The first location of the program is location zero. The address of the last byte of the program is loaded, by the controller 7, into the transfer address store 15 of the address recognition and memory select apparatus 14 of FIG. 2. The controller then asserts the Q-output of the run flip-flop 19. After the next execution of the jump instruction of the idle loop, the memory recognition and memory select apparatus 14 will switch operation to the diagnostic memory 8 where program execution will commence at location zero. At the end of program execution, the address compare circuit 16 will recognize the last byte and switch operation back to the idle memory 9. The results of program execution in the diagnostic memory 8 are then available to the controller. The diagnostic memory can be reloaded and the process repeated.

In some applications, it may be desirable to start the program execution at different locations in the diagnostic memory 8; and it would therefore be necessary to change the jump operands in the idle loop program. This can be done by introducing a copy of the idle loop program in the diagnostic memory 8 and causing the apparatus to switch execution to it in the usual way. The idle memory 9 is then available for controller modification of its jump operand. After the idle memory has been changed the controller forces program execution to it. The address compare means are not used in this case and the diagnostic memory 8 is now available for loading, as before.

Computer memory having the same addresses as the diagnostic memory can be read. As stated before, the drive buffer 12 of FIG. 1 insures that responses in such cases of contention are resolved to provide diagnostic memory data to the computer. Potential application handicaps due to memory contention can be eliminated by using well known methods that make the diagnostic memory relocatable as will now be discussed in connection with FIG. 3.

Figure 3:
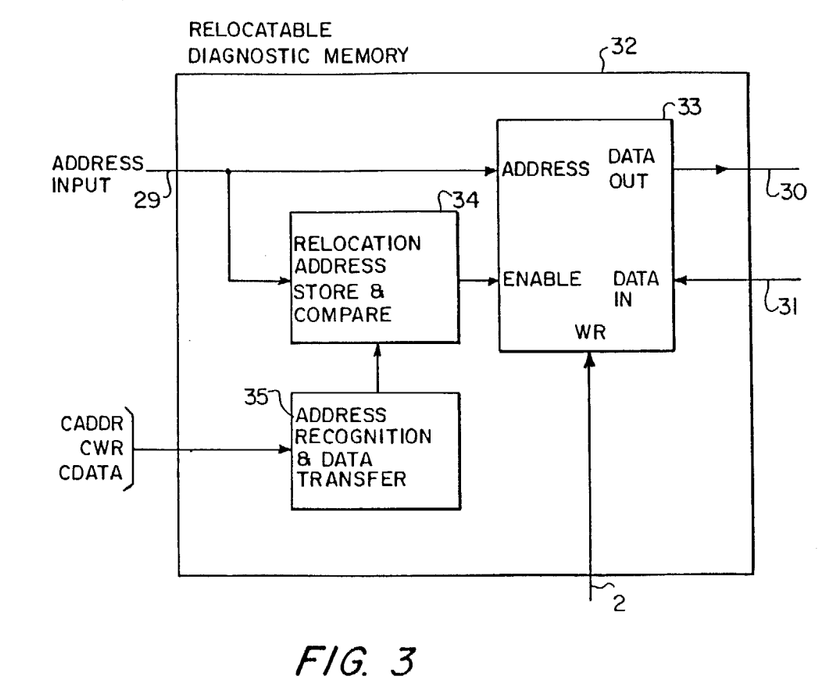
FIG. 3 is a block diagram of an alternate embodiment of the diagnostic memory component of the invention.

Relocatable diagnostic memory is illustrated in the block diagram of an alternate embodiment of the diagnostic memory 8 in FIG. 3. Relocation gives the controller 7 the ability to establish the addresses of the memory. Connections of: the address, 29; the data out, 30; the data in, 31; and the write signal 2 of the relocatable memory 32, are the same as those depicted in FIG. 1. In addition, controller signals CADDR, CWR, and CDATA are connected to the memory in order to allow communication of relocation addresses. The least significant 10-address bus signals at 29 are directly connected to the memory circuit 33 to address its exemplary 1024 locations. The remaining six address bus signals are connected to a relocation address store and compare circuit 34 that inhibits or enables memory data transfer by means of a connection to the enable input of the memory. An address recognition and data transfer circuit 35 operates as before described in connection with similar circuits in FIG. 2. The memory location feature operates by means of controller data transfers to the relocation address store in circuit 34. When address having high order six signal states matching those in the store occur, the memory is enabled. In this manner, the controller 7 can cause the first address of the memory to be any one of 64 addresses that are multiples of 1024, including address zero.

In recapitulation, therefore, the invention embraces the basic idea of keeping the computer under control executing program continuously. It usually alternates between programs in the idle memory and the diagnostic memory. The idle memory program keeps the computer busy while test results in the diagnostic memory are examined and a new program is loaded into the diagnostic memory.

There are then two types of transitions that must be dealt with: Diagnostic to idle memory, and idle to diagnostic memory. The former is done with the address recognition circuits. When the terminal address of the diagnostic program is recognized, the switch occurs. The terminal address, or breakpoint, must be preset before the diagnostic program is started.

Transfer from the idle to the diagnostic memory is done by the apparatus. When the idle loop program is at the point of jumping back to its beginning, the switch occurs and the computer jumps instead to the first address of the diagnostic program. This requires alignment between the idle memory jump destination address and the first address of the diagnostic program. In turn, this calls for the ability to change the idle jump destination, essentially while the idle loop is being exhausted.

Further modifications will occur to those skilled in this art and such are considered to fall within the spirit and scope of the invention as defined in the appended claims.

What is claimed is:

1. A method of testing equipment containing a computer having internal memory that stores data upon which the computer operates in a normal manner, that comprises, providing addressable memory external to said equipment for storing data in two sets of data elements, storing data in one of said sets representing a multi-step diagnostic program for testing said equipment, storing data in the other of said sets representing a repetitive multi-step idle loop program, controlling the computer to cause it to cease operation upon data in its internal memory in said normal manner and instead to operate upon said diagnostic program to generate test result data that are stored in said one set of data elements, and then to operate upon said idle loop program, with the computer alternating operation thereof between said programs, and transferring diagnostic data to and test result data from said one of said sets of data elements while said computer is operating repetitively upon the idle loop program in the other set.

2. A method as claimed in claim 1, wherein said two sets of data elements comprise first and second parts of the external memory, respectively.

3. A method as claimed in claim 2, wherein said first and second parts of the external memory are connected to the computer in synchronism with the normal operation of the computer.

4. A method as claimed in claim 2, wherein the first and second parts of the external memory are connected to the computer with arbitrary timing and without regard for the state of the normal operation of the computer.

5. A method as claimed in claim 2, wherein the computer operates upon data of the data elements of the second part of the external memory in a sequence determined by computer address signals generated in said equipment, each data element of said second memory part corresponding to a unique computer address; and wherein the computer operates upon data of the data elements of the first part of the external memory in a sequence that is independent of said equipment.

6. A method as claimed in claim 2, wherein there is correspondence between at least some of the addresses in said internal memory and said external memory and wherein in the event of a conflict between data to be operated upon at a particular address of the internal memory and the corresponding address of the external memory, the conflict is resolved by forcing the computer to operate upon the data at the address of the external memory.

7. Apparatus for testing equipment containing a computer having internal memory that stores data upon which the computer operates in a normal manner, said apparatus having, in combination, memory means external to said equipment and containing two sets of selectable data elements, the data elements of one set storing a multistep diagnostic program for testing said equipment and the data elements of the other set storing a repetitive multi-step idle loop program,; and control means for causing said computer to cease operation upon data stored in its internal memory in said normal manner and instead to operate upon said diagnostic program to generate test result data that are stored in said one set of data elements, and then to operate upon said idle loop program, with the operation of said computer alternating between said programs, said control means including means for transferring diagnostic data to and test result data from said one of said two sets of data elements while the computer operates repetitively upon the idle loop program of the other set of data elements.

8. Apparatus as claimed in claim 7, wherein said external memory means comprises first and second memory means having said sets of data elements therein, respectively, and wherein said control means includes a controller and switching means for connecting said computer to said first memory means in response to a control signal from said controller and for connecting said computer to said second memory means in response to data at a particular address in said first memory means.

9. Apparatus as claimed in claim 7, wherein the data elements of other of said sets have addresses corresponding to addresses of the internal memory, respectively.

10. Apparatus as claimed in claim 7, wherein said control means includes means for switching of the computer from operation upon data of said one of said two sets of data elements to operation upon data of the other set of data elements in response to data at a particular data element of said one set.

11. Apparatus as claimed in claim 7, wherein said control means includes a controller external to said equipment and means responsive to a signal from the controller for switching said computer from operation upon data of said other of said two sets of data elements to operation upon data of said one set.

12. Apparatus as claimed in claim 7, further including reset generator means responsive to the control means for causing the computer to assume predetermined internal states for selecting specific data elements in a predetermined manner for processing.

* * * * *